April 27, 1965 B. FOX 3,181,101

DETACHABLE CONNECTORS

Original Filed April 22, 1958

INVENTOR.
BENJAMIN FOX

BY
Calsar and Rivise

ATTORNEYS.

3,181,101
DETACHABLE CONNECTORS

Benjamin Fox, 403 Gribbel Road, Wyncote, Pa.
Original application Apr. 22, 1958, Ser. No. 730,227. Divided and this application Oct. 24, 1961, Ser. No. 147,255
6 Claims. (Cl. 339—17)

This case is a divisional application of application Serial No. 730,227, filed April 22, 1958.

My invention relates to quick detachable connectors having contacts of the type shown in my patents, Re. 23,547 of September 9, 1952, and Patent No. 2,750,572 of June 12, 1956.

In the aforementioned patents, bifurcated contact members were adapted to interfit with similar bifurcated contact members to provide good electrical connections and to be quickly connected or disconnected.

The primary object of the present invention is to mount a plurality of bifurcated contact members on a single board such as those used in printed circuits and to have a complementary printed circuit board with interfitting bifurcated contact members. The bifurcated connectors are adapted to interfit with similar or complementary bifurcated connectors, each set of complementary connectors being mounted at an angle of 45° to the plane of the board.

Another object of my present invention is to mount quick detachable electrical contact members upon a printed circuit board whereby the contacts are self-locking and self-sustaining, and wherein additional securing means may be used both to hold and to guide the separable printed circuit board members of the connector.

Another object of my invention is to mount quick detachable contacts on printed circuit boards whereby the boards are mounted either in the same plane or in planes extending at a right angle to one another.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawings, in which.

Figures 1, 3:
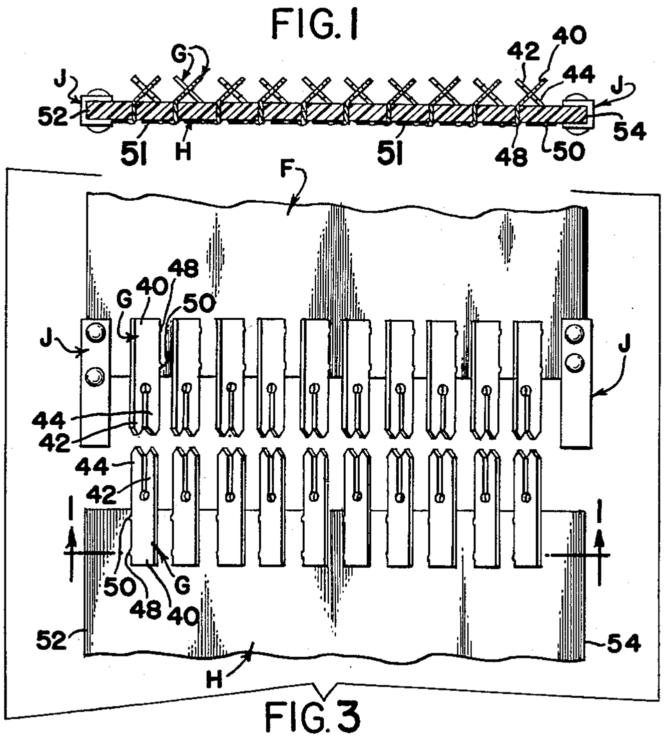
FIG. 1 is a sectional view of one of the printed circuit boards taken along the line 1—1 of FIG. 3.
FIG. 3 shows two similar series of bifurcated contacts according to my present invention mounted upon complementary printed circuit boards which are disposed in alignment with one another for connection by means of the contact thereno.
Figure 2:
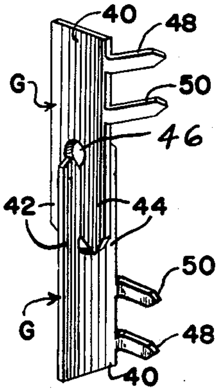
FIG. 2 is a perspective view showing how two contacts of my present invention are coupled together.

Referring now in greater detail to the drawings wherein like reference characters refer to like parts, I show in FIGS. 1, 2 and 3 a pair of printed circuit boards, generally designated as F and H, on which a plurality of similar, bifurcated contacts, generally designated as G, are mounted. It should be observed in FIG. 3 that the printed circuit boards F and H are mounted to be in alignment with one another, that is, they lie in a common plane.

Each contact G has a body portion of conducting metal 40 which terminates at one end in a bifurcation, whereby two legs 42 and 44 are formed. The flat legs 42 and 44 of electrical conducting material are spaced by a longitudinal slot which extends from one end and terminates at an opening 46 close to the center of contact G. The legs have, on the surfaces adjacent to one another, beveled edges to provide the area of contact, as illustrated in my prior issued patents identified above.

Projecting laterally at an angle of 135° to the body 40 and thus lying in a common plane are a pair of holding legs 48 and 50. These legs 48 and 50 are adapted to pierce the boards F and G and hold the body 40 at an angle of 45° to the plane of the board when the ends of the holding legs are peened over. As shown in FIG. 1 the ends of the legs 48 and 50 are thereby brought into mechanical and electrical contact with printed circuit means or conductors 51 which extend from the lower surface of the printed circuit boards.

The two printed circuit boards F and H have a plurality of aligned complementary, bifurcated contacts G mounted thereon adjacent to the proximate ends thereof in parallel relation whereby the electrical contacts G, G on the respective boards F and H can interfit one with the other. Contacts G, G on each of the boards F and H, although constructed identical, are positioned upon the board F and H to interfit, since the legs of each contact are disposed at an angle of 90° to the leg of the other.

In order that the printed circuit boards F and H may be properly aligned, I place a U-shaped guide and holder J at each side of one of the boards, for example, the board F, as illustrated in FIG. 3, so that the edges 52 and 54 of the printed circuit board H will be guided within the U-shaped guides J, J on board F. The guides insure proper interfitting relationship of the contacts G, G and also hold the boards F and H securely together.

It should be observed that the printed circuit boards can be arranged to extend at an angle of 90° to one another or as shown in FIG. 3, the boards are arranged to be in the same plane. In each case, however, the bifurcated end of each contact F and G is arranged to be located at 45° to the plane of the board, and the complementary contacts interfit so that their respective legs are located in planes 90° to one another.

Although my invention has been described in considerable detail, such description is intended as being illustrative rather than limiting, since the invention may be variously embodied, and the scope of the invention is to be determined as claimed.

I claim as my invention:

1. The combination of a printed circuit board and a mating connector member, at least one pair of electrical contacts comprising a first contact mounted on said printed circuit board and a second contact mounted on said connector member, said first and second contacts each including a body portion having parts shaped to interfit one with the other at right angles, said body portion of said first contact lying essentially in a single plane, at least one holding leg depending at an obtuse angle from said body portion of said first contact, said holding leg securing said first contact to said printed circuit board and extending normally through said printed circuit board whereby said body portion of said first contact will be positioned at an acute angle with respect to said printed circuit board.

2. The invention of claim 1 wherein said first-named contact is bifurcated.

3. The invention of claim 1 wherein said body portion of said first contact is positioned at a 45° angle with respect to said printed circuit board.

4. The invention of claim 1 wherein said mating connector member is a second printed circuit board with said second contact member mounted thereon.

5. The invention of claim 1 wherein said holding leg is in contact with a printed member of said printed circuit board.

6. The combination of a printed circuit board and a mating connector member, at least one pair of electrical contacts comprising a first contact mounted on said printed circuit board and a second contact mounted on said connector member, said first and second contacts each including a body portion having parts shaped to interfit one with the other, said body portion of said first contact lying essentially in a single plane, at least one holding leg depending at an obtuse angle from said portion of said first contact, said holding leg securing said first contact to said printed circuit board and extending normally through said printed circuit board whereby said body portion of said first contact will be positioned at an acute angle with respect to said printed circuit board, said mating connector member being a second printed circuit board with said second contact member mounted thereon and where said printed circuit boards are disposed in substantially end-to-end relation, said second contact being substantially similar in construction and mounting to said first contact.

References Cited by the Examiner

UNITED STATES PATENTS

| | | | |
|---|---|---|---|
| 2,750,572 | 6/56 | Fox | 339—185 |
| 2,832,013 | 4/58 | Pedersen et al. | 339—17 |
| 2,946,976 | 7/60 | Blain | 339—17 |
| 2,994,056 | 7/61 | Fox | 339—220 |

FOREIGN PATENTS

| | | |
|---|---|---|
| 357,171 | 9/31 | Great Britain. |

OTHER REFERENCES

"Electronic Industries and Tele-Tech," October 1956; article by Dr. H. E. Ruehlemann entitled "New Design in Ruggedized P–C Connectors," pages 62, 63, 158, 159, 161, 162.

JOSEPH D. SEERS, *Primary Examiner.*

Disclaimer 3,181,101.—*Benjamin Fox*, Wyncote, Pa. DETACHABLE CONNECTORS. Patent dated Apr. 27, 1965. Disclaimer filed Feb. 28, 1966, by the assignee, *Elco Corporation.*

Hereby enters this disclaimer to claims 1 to 6 of said patent.

[*Official Gazette May 31, 1966.*]